United States Patent
Bae (10) Patent No.: US 10,491,043 B2
(45) Date of Patent: *Nov. 26, 2019

(54) RESONANT COIL, WIRELESS POWER TRANSMITTER USING THE SAME, WIRELESS POWER RECEIVER USING THE SAME

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 168 days.

This patent is subject to a terminal disclaimer.

(21) Appl. No.: 15/424,179

(22) Filed: Feb. 3, 2017

(65) Prior Publication Data
US 2017/0149292 A1 May 25, 2017

Related U.S. Application Data

(63) Continuation of application No. 14/124,997, filed as application No. PCT/KR2012/003152 on Apr. 24, 2012, now Pat. No. 9,601,269.

(30) Foreign Application Priority Data

Jun. 8, 2011 (KR) .......... 10-2011-0055290

(51) Int. Cl.
*H02J 50/12* (2016.01)
*H01F 38/14* (2006.01)
(Continued)

(52) U.S. Cl.
CPC .......... *H02J 50/12* (2016.02); *H01F 27/2823* (2013.01); *H01F 27/324* (2013.01);
(Continued)

(58) Field of Classification Search
CPC ......... H02J 50/12; H02J 5/005; H01F 27/324; H01F 27/2823; H01F 38/14; H01F 2038/146; H04B 5/0093
See application file for complete search history.

(56) References Cited

U.S. PATENT DOCUMENTS 2,086,629 A 7/1937 Mead
5,021,738 A * 6/1991 Vernon .............. G01N 27/9033
324/232

(Continued)

FOREIGN PATENT DOCUMENTS

JP 2011-082212 A 4/2011
KR 100276264 B1 9/2000
(Continued)

OTHER PUBLICATIONS

International Search Report in International Application No. PCT/KR2012/003152, filed Apr. 24, 2012.
(Continued)

*Primary Examiner* — Jared Fureman
*Assistant Examiner* — Michael J Warmflash
(74) *Attorney, Agent, or Firm* — Saliwanchik, Lloyd & Eisenschenk (57) ABSTRACT

Disclosed is a coil for wirelessly transmitting or receiving power. The coil includes a coil unit formed by winding a plurality of wires insulated from each other; and a capacitor connected to the coil unit. The wires of the coil unit are shorted at a predetermined interval.

20 Claims, 7 Drawing Sheets

(51) Int. Cl.
　　　*H04B 5/00*　　　　　(2006.01)
　　　*H01F 27/28*　　　　(2006.01)
　　　*H01F 27/32*　　　　(2006.01)
　　　*H02J 5/00*　　　　　(2016.01)

(52) U.S. Cl.
　　　CPC .............. *H01F 38/14* (2013.01); *H02J 5/005* (2013.01); *H04B 5/0093* (2013.01); *H01F 2038/146* (2013.01)

(56) References Cited

U.S. PATENT DOCUMENTS

| 6,027,367 | A | 2/2000 | Woertz et al. | |
|---|---|---|---|---|
| 6,445,092 | B1 * | 9/2002 | Marder | H02K 41/03 310/12.21 |
| 6,649,842 | B1 * | 11/2003 | Nishino | H01B 7/30 174/110 R |
| 9,601,269 | B2 * | 3/2017 | Bae | H01F 38/14 |
| 2005/0288741 | A1 | 12/2005 | Hassler, Jr. et al. | |
| 2006/0103238 | A1 | 5/2006 | Enders et al. | |
| 2009/0170148 | A1 | 7/2009 | Smirnova et al. | |
| 2009/0230777 | A1 * | 9/2009 | Baarman | H01F 38/14 307/104 |
| 2012/0286584 | A1 | 11/2012 | Park et al. | |
| 2013/0270921 | A1 * | 10/2013 | Boys | H01F 38/14 307/104 |

FOREIGN PATENT DOCUMENTS

| KR | 1020060049692 A | 5/2006 |
|---|---|---|
| KR | 1020100042292 A | 4/2010 |
| KR | 20100130985 A | 12/2010 |
| KR | 20110049659 A | 5/2011 |
| KR | 1020120033756 A | 4/2012 |

OTHER PUBLICATIONS

Notice of Allowance dated Jun. 8, 2012 in Korean Application No. 1020110055290.
Office Action dated May 31, 2016 in U.S. Appl. No. 14/124,997.
Notice of Allowance dated Nov. 3, 2016 in U.S. Appl. No. 14/124,997.

* cited by examiner

(a) wire is not open (b) wire is open (related art)

(c) wire is shorted at predetermined interval (embodiment)

RESONANT COIL, WIRELESS POWER TRANSMITTER USING THE SAME, WIRELESS POWER RECEIVER USING THE SAME

CROSS-REFERENCE TO RELATED APPLICATIONS

This application is a continuation of U.S. application Ser. No. 14/124,997, filed Dec. 9, 2013; which is a 371 of International Patent Application No. PCT/KR2012/003152, filed Apr. 24, 2012; which claims priority to Korean Application No. 10-2011-0055290, filed Jun. 8, 2011, the disclosures of each of which are incorporated herein by reference in their entirety.

BACKGROUND

The embodiment relates to a wireless power transmission. More particularly, the embodiment relates to a resonant coil, a wireless power transmitter using the same, and a wireless power receiver using the same used in a wireless power transmission using resonance, in which wires constituting a litz coil used for a wireless power transceiving coil are shorted at a predetermined interval so that the spark can be reduced.

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electric energy by irradiating electromagnetic waves, such as radio waves or lasers, has been suggested. Actually, electric toothbrushes or electric razors, which are frequently used in daily life, are charged based on the principle of electromagnetic induction. Until now, the long-distance transmission using the magnetic induction, the resonance and the short-wavelength radio frequency has been used as the wireless energy transfer scheme.

A plurality of coils are used for the wireless power transmission. For instance, litz coils are mainly used for the wireless power transmission. The litz coil consists of a plurality of wires and the spark may occur due to potential difference between the wires if one of the wires is open.

Technical Problem

The embodiment is provided to solve the problem of the litz coil and an object of the embodiment is to reduce the spark by shorting the wires of the litz coil at a predetermined interval.

Solution to Problem

A coil for wirelessly transmitting or receiving power according to the embodiment includes a coil unit formed by winding a plurality of wires insulated from each other; and a capacitor connected to the coil unit, wherein the wires of the coil unit are shorted at a predetermined interval.

A wireless power transmitter according to the embodiment includes a transmission coil for transmitting power supplied from a power source using an electromagnetic induction and a transmission resonant coil coupled with the transmission coil to transmit the power using resonance, wherein at least one of the transmission coil and the transmission resonant coil includes a coil unit formed by winding a plurality of wires which are insulated from each other and shorted at a predetermined interval and a capacitor connected to the coil unit.

A wireless power receiver for wirelessly receiving power from a wireless power transmitter to transmit the power to a load includes a receiving resonant coil for receiving the power from a transmission resonant coil of the wireless power transmitter by using resonance and a receiving coil for receiving the power from the receiving resonant coil using an electromagnetic induction to transmit the power to the load, wherein at least one of the receiving resonant coil and the receiving coil includes a coil unit formed by winding a plurality of wires which are insulated from each other and shorted at a predetermined interval and a capacitor connected to the coil unit.

Advantageous Effects of Invention

According to the embodiment, the spark can be reduced even if one of the wires constituting the litz coil used for the wireless power transceiving coil is open.

DETAILED DESCRIPTION

Hereinafter, embodiments will be described in more detail with reference to accompanying drawings.

Figure 1:
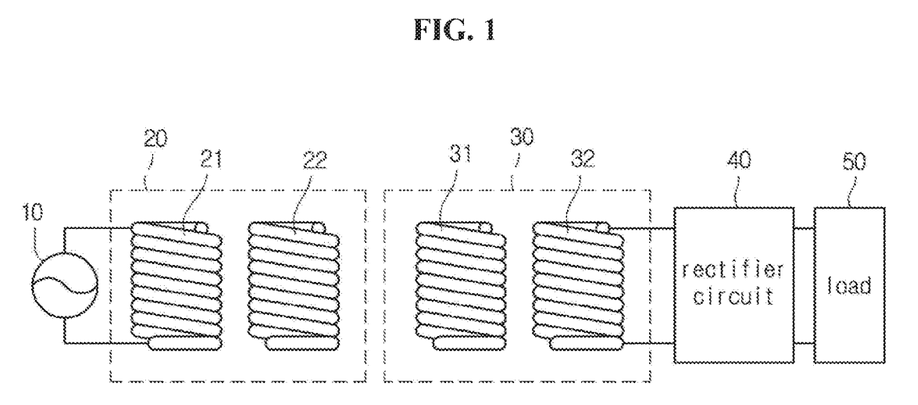
FIG. 1 is a view showing the structure of a wireless power transmission system according to one embodiment.

FIG. 1 is a view showing the structure of a wireless power transmission system according to one embodiment.

Power generated from a power source 10 is transmitted to a transmitter 20 and then transmitted to a receiver 30 that forms a resonant circuit with the transmitter 20 using resonance, that is, has a resonant frequency value equal to that of the transmitter 20. The power transmitted to the receiver 30 is transmitted to a load 50 through a rectifier circuit 40. The load 50 may be a battery or a device requiring the power.

In detail, the power source 10 is an AC power source to provide AC power having a predetermined frequency.

The transmitter 20 includes a transmission coil 21 and a transmission resonant coil 22. The transmission coil 21 is connected to the power source 10 and AC current is applied to the transmission coil 21. As the AC current is applied to the transmission coil 21, the AC current is induced to the transmission resonant coil 22, which is physically spaced apart from the transmission coil 21, using the electromagnetic induction. The power transmitted to the transmission resonant coil 22 is transmitted to the power receiver 30, which forms a resonant circuit together with the power transmitter 10 using resonance.

According to the power transmission using the resonance, the power can be transmitted between two LC circuits which are impedance-matched. The power transmission using the resonance can transmit the power farther than the power transmission using the electromagnetic induction with the high power transmission efficiency.

The power receiver 30 includes a receiving resonant coil 31 and a receiving coil 32. The power transmitted through the transmission resonant coil 22 is received in the receiving resonant coil 31 so that the AC current is applied to the receiving resonant coil 31. The power transmitted to the receiving resonant coil 31 is transmitted to the receiving coil 32 using the electromagnetic induction. The power transmitted to the receiving coil 32 is rectified through the rectifier circuit 40 and then transmitted to the load 50.

The transmitting resonant coil of the power transmitter 20 transmits power to the receiving resonant coil of the power receiver 30 using magnetic field. The transmitting resonant coil and the receiving resonant coil are magnetically coupled and each of them can operate at resonant frequency. Resonant coupling of the transmitting resonant coil and the receiving resonant coil significantly improves power transmission efficiency between the power transmitter 20 and the power receiver 30.

Figure 2:
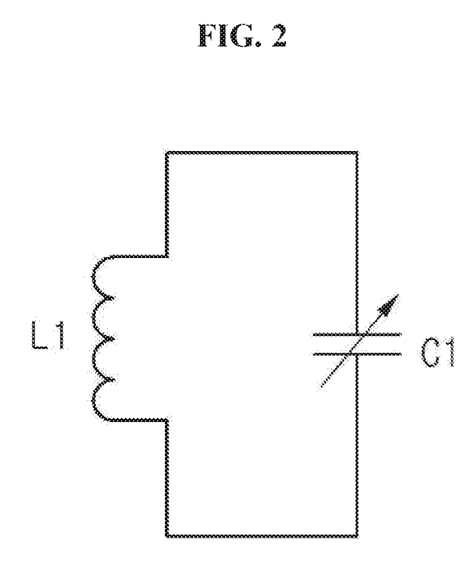
FIG. 2 is a view showing an equivalent circuit of a transmission coil 21 according to one embodiment.

FIG. 2 shows the equivalent circuit of the transmission coil 21 according to one embodiment. As shown in FIG. 2, the transmission coil 21 may include an inductor L1 and a capacitor C1 and a circuit having predetermined inductance and capacitance values can be formed by using the inductor L1 and the capacitor C1. The capacitor C1 may be a variable capacitor and the impedance matching can be performed by controlling the variable capacitor. The equivalent circuit of the transmission resonant coil 22, the receiving resonant coil 31 and the receiving coil 22 may be equal to the equivalent circuit shown in FIG. 2.

Figure 3:
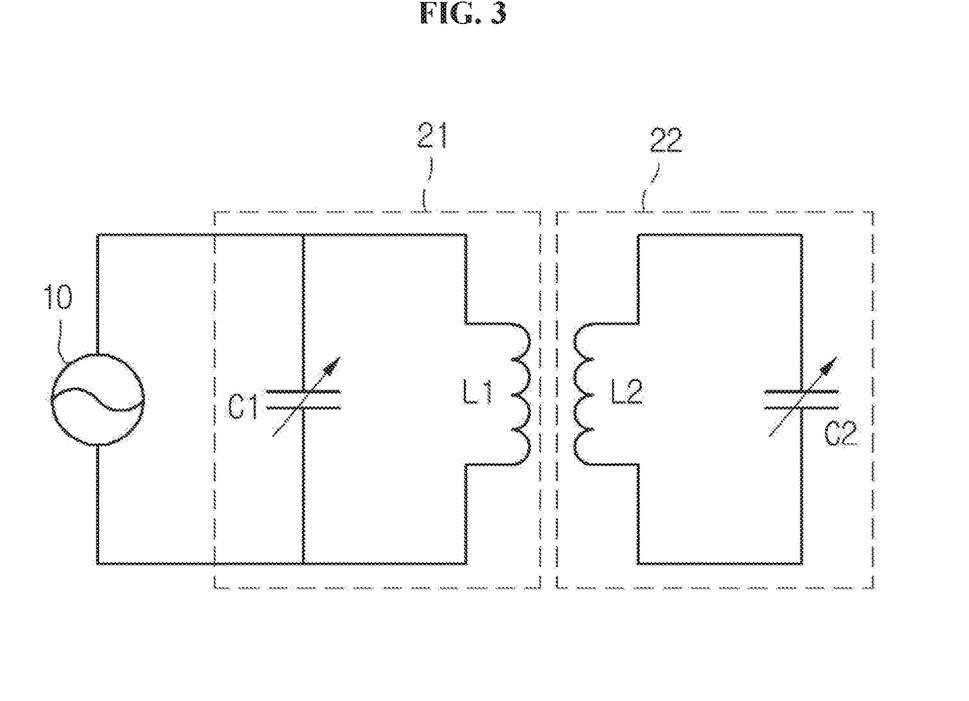
FIG. 3 is a view showing an equivalent circuit of a power source 10 and a transmitter 20 according to one embodiment.

FIG. 3 is a view showing an equivalent circuit of the power source 10 and the transmitter 20 according to one embodiment. As shown in FIG. 3, the transmission coil 21 and the transmission resonant coil 22 may consist of inductors L1 and L2 having predetermined inductance values and capacitors C1 and C2 having predetermined capacitance values, respectively.

Figure 4:
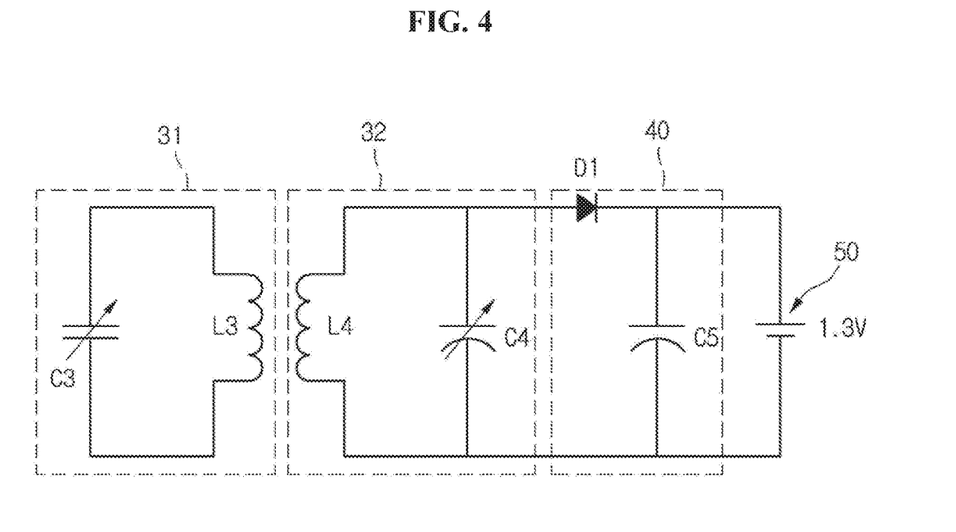
FIG. 4 is a view showing an equivalent circuit of a receiving resonant coil 31, a receiving coil 32, a smoothing circuit 40 and a load 50.

FIG. 4 is a view showing an equivalent circuit of the receiving resonant coil 31, the receiving coil 32, the smoothing circuit 40 and the load 50.

As shown in FIG. 4, the receiving resonant coil 31 and the receiving coil 32 may consist of inductors L3 and L4 having predetermined inductance values and capacitors C3 and C4 having predetermined capacitance values, respectively. The smoothing circuit 40 may consist of a diode D1 and a smoothing capacitor C5 and can output DC power by converting AC power to the DC power. Although the load 50 is shown as a DC power source of 1.3V, the load 50 may be a battery or a device requiring the DC power.

Figure 5:
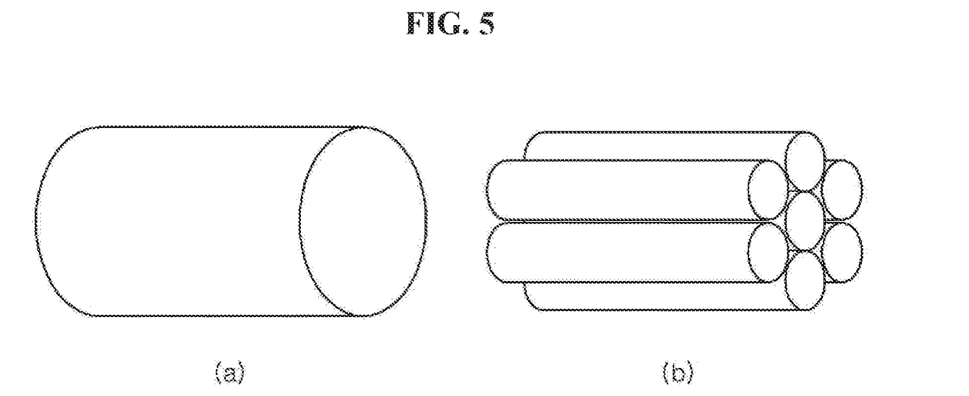
FIG. 5 is a view showing a wire of the related art and a litz coil according to one embodiment.

Meanwhile, a plurality of wires as shown in FIG. 5(b) can be used for the coils 21, 22, 31 and 32. Preferably, the wires are litz wires insulated from each other. Different from the single wire shown in FIG. 5(a), the litz wires shown in FIG. 5(b) can be obtained by combining a plurality of wires insulated from each other.

The litz wires can be preferably used because the litz wires can reduce the skin effect. The skin effect refers to the phenomenon, in which current flows toward a surface of a wire when time-variable current flows along the wire. If the current flows toward the surface of the wire, the current rarely reach to the center of the wire, so a section area of the wire through which the current flows may be reduced, resulting in the increase of resistance.

If the litz wires are employed, the sectional area of the wire can be enlarged so that the skin effect can be prevented and the sectional area of the total wires can be widened. Thus, it is possible to prevent the resistance components of the coil from being increased.

At this time, the current may flow through each litz wire having a thin thickness. If one of the litz wires is open, potential difference may occur between the litz wire having the open section and other litz wires and between the open section and a non-open section of the litz wire. In the case of high power transmission, the potential difference may generate the spark through the insulating material (cladding) of each litz wire.

Figure 6:
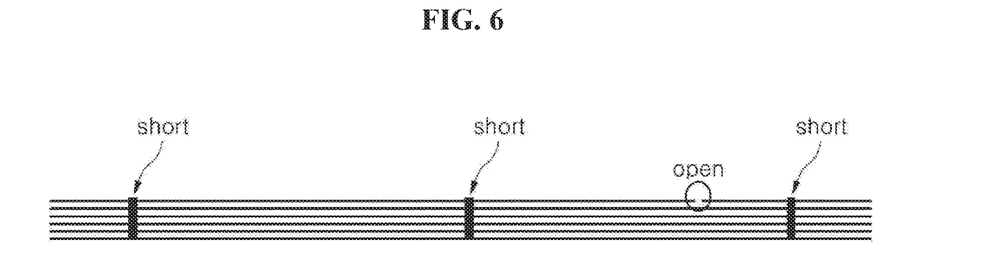
FIG. 6 is a view showing the structure of a litz coil according to one embodiment.

However, as shown in FIG. 6, according to the embodiment, a litz coil consisting of a plurality of wires is shorted at a predetermined interval. The short of the litz coil can be achieved by removing an insulating material from each wire at a predetermined interval and then connecting the wires with each other using a conductor.

As the number of shorts in the litz coil increases, the possibility of the spark can be reduced. However, if the interval of the short in the litz coil is too narrow, the resistance value may be increased due to the skin effect. Thus, the wires are shorted at a predetermined interval such that the resistance value caused by the skin effect can be reduced while lowering the possibility of the spark.

The interval of the short capable reducing the resistance value caused by the skin effect while lowering the possibility of the spark is in the range of about 0.01 m to about 100 m. However, the above range of about 0.01 m to about 100 m is illustrative purpose only.

Figure 7:
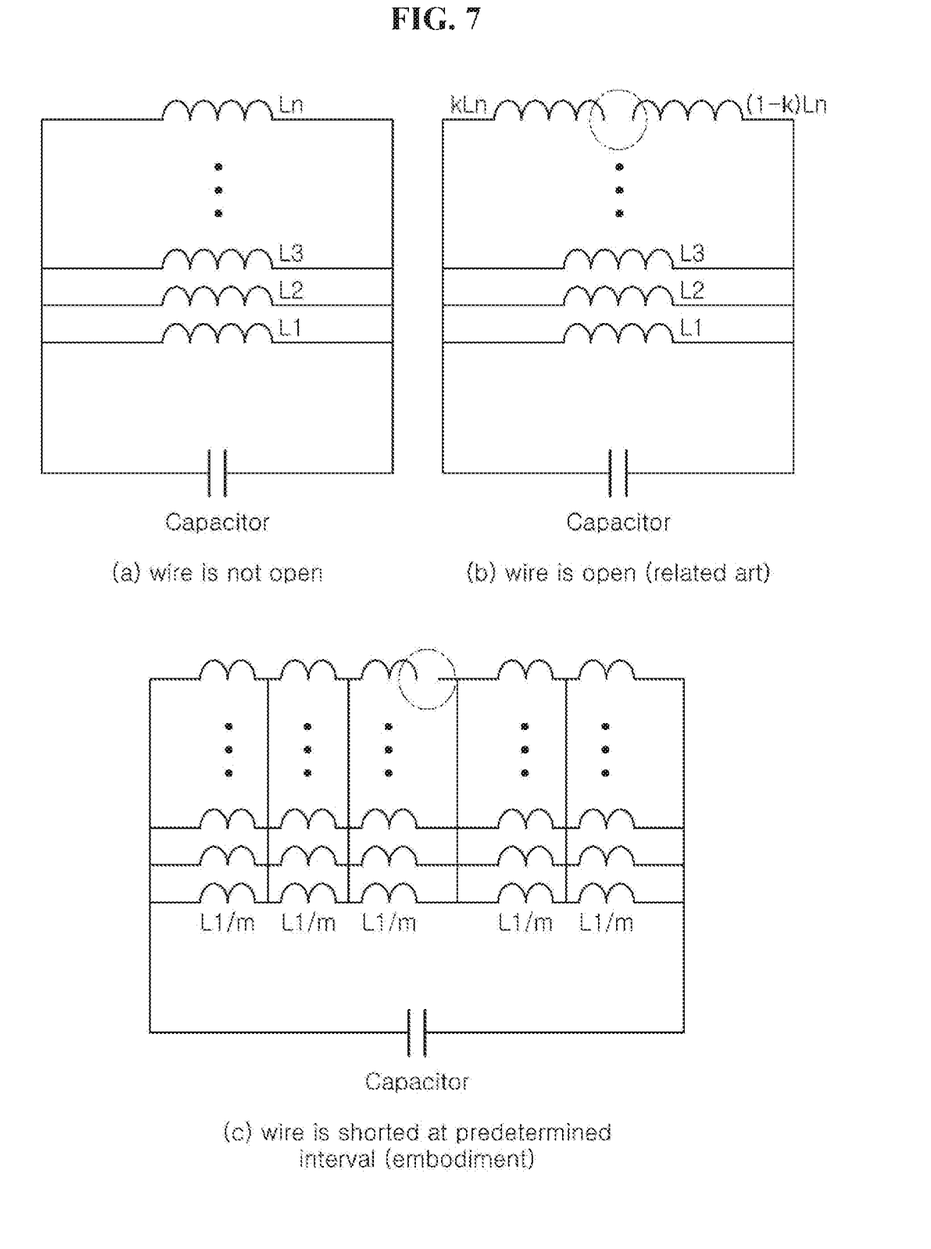
FIG. 7 is a view showing equivalent circuits corresponding to the status of a litz coil according to one embodiment.

FIG. 7 is a view showing equivalent circuits corresponding to the status of the litz coil according to one embodiment.

Referring to FIG. 7, inductors L1, L2 and L3 represent the inductance components of wires constituting the litz coil and have the same inductance value.

If there is no open wire as shown in FIG. 7(a), the spark may not occur because the same voltage is generated at the same position of each wire.

If there is one open wire as shown in FIG. 7(b), the potential difference may occur about the open section, so the spark may be generated due to the potential difference between the wires.

If the wires are shorted at a predetermined interval as shown in FIG. 7(c), for instance, if the wires are shorted at the interval of "m" by equally dividing the length of the wire, the potential difference about the open section of the wire may be reduced to 1/m. This is because the shorted region has the same voltage and the same voltage is applied to each inductor.

According to the above construction, the spark caused by the open of the wire can be prevented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A coil unit for wirelessly transmitting or receiving power, comprising:
   a first coil;
   a second coil comprising an open section;
   a first conductor connecting the first coil and the second coil; and
   a second conductor connecting the first coil and the second coil and positioned adjacent to the first conductor,
   wherein the open section is positioned between the first conductor and the second conductor.

2. The coil unit of claim 1, wherein the first coil and the second coil are electrically connected in parallel with each other.

3. The coil unit of claim 1, comprising an insulator between the first coil and the second coil,
   wherein the first conductor and the second conductor pass through the insulator, and
   wherein the insulator comprises holes through which the first conductor and the second conductor pass.

4. The coil unit of claim 1, wherein the first conductor and the second conductor are positioned at a predetermined interval.

5. The coil unit of claim 1, wherein a plurality of the first conductors and a plurality of the second conductors are positioned throughout an entirety of the first coil and the second coil.

6. A wireless power apparatus for wirelessly transmitting or receiving power, comprising:
   a first coil;
   a second coil comprising an open section;
   a capacitor connected to the first coil and the second coil;
   a first conductor connecting the first coil and the second coil; and
   a second conductor connecting the first coil and the second coil and positioned adjacent to the first conductor,
   wherein the open section is positioned between the first conductor and the second conductor.

7. The wireless power apparatus of claim 6, wherein the first coil and the second coil are electrically connected in parallel with each other.

8. The wireless power apparatus of claim 6, comprising an insulator between the first coil and the second coil,
   wherein the first conductor and the second conductor pass through the insulator, and
   wherein the insulator comprises holes through which the first conductor and the second conductor pass.

9. The wireless power apparatus of claim 6, wherein the first conductor and the second conductor are positioned at a predetermined interval.

10. The wireless power apparatus of claim 6, wherein a plurality of the first conductors and a plurality of the second conductors are positioned throughout an entirety of the first coil and the second coil.

11. A coil unit for wirelessly transmitting or receiving power, comprising:
    a first coil;
    a second coil comprising an open section; and
    a plurality of conductors connecting the first coil and the second coil,
    wherein the plurality of conductors is absent in the open section.

12. The coil unit of claim 11, wherein the first coil and the second coil are electrically connected in parallel with each other.

13. The coil unit of claim 11, comprising an insulator between the first coil and the second coil,
    wherein the plurality of conductors passes through the insulator, and
    wherein the insulator comprises holes through which the plurality of conductors passes.

14. The coil unit of claim 11, wherein conductors of the plurality of conductors are positioned at predetermined intervals.

15. The coil unit of claim 11, wherein the plurality of conductors is positioned throughout an entirety of the first coil and the second coil.

16. A wireless power apparatus for wirelessly transmitting or receiving power, comprising:
    a first coil;
    a second coil comprising an open section;
    a capacitor connected to the first coil and the second coil; and
    a plurality of conductors connecting the first coil and the second coil,
    wherein the plurality of conductors is absent in the open section.

17. The wireless power apparatus of claim 16, wherein the first coil and the second coil are electrically connected in parallel with each other.

18. The wireless power apparatus of claim 16, comprising an insulator between the first coil and the second coil,
    wherein the plurality of conductors passes through the insulator, and
    wherein the insulator comprises holes through which the plurality of conductors passes.

19. The wireless power apparatus of claim 16, wherein conductors of the plurality of conductors are positioned at predetermined intervals.

20. The wireless power apparatus of claim 16, wherein the plurality of conductors is positioned throughout an entirety of the first coil and the second coil.

* * * * *